United States Patent [19]

Lepley

[11] Patent Number: 4,489,348
[45] Date of Patent: Dec. 18, 1984

[54] VIDEO CAMERA SYNCHRONIZER

[75] Inventor: John A. Lepley, Lawton, Mich.

[73] Assignee: Gordon W. Hueschen, Kalamazoo, Mich.

[21] Appl. No.: 422,361

[22] Filed: Sep. 23, 1982

[51] Int. Cl.³ .............................................. H04N 5/04
[52] U.S. Cl. ...................................... 358/149; 358/19
[58] Field of Search ........................ 358/149, 19, 148

[56] References Cited

U.S. PATENT DOCUMENTS

| | | | |
|---|---|---|---|
| 3,555,185 | 1/1971 | Skrydstrup | 358/149 |
| 3,655,913 | 4/1972 | Schneider | 358/149 |
| 3,758,720 | 9/1973 | Dinn | 358/149 |
| 4,155,099 | 5/1979 | Michaud | 358/149 |

Primary Examiner—Michael A. Masinick
Attorney, Agent, or Firm—Gordon W. Hueschen

[57] ABSTRACT

An apparatus for providing video signal synchronized operation between two or more video signal originating devices, such as video color cameras, one operating as a master, and the other one or more video cameras or devices operating as slaves or masters, is described. The apparatus takes the latch output of the master camera channel and derives a positive-going ramp one horizontal line long. The slave latch output is also caused to form a sample pulse. The master ramp and slave sample pulse are compared and the resultant positive correction voltage is applied to the voltage controlled oscillator of the slave. The apparatus develops positive error pulses if the master and slave video signals are not synchronized. The error pulses are combined with the slave composite sync, resulting in a series of sharp, negative-going, oscillator shut-off pulses for slowing down the slave sync generator until the master catches up with the slave, the pulses being turned off when the master and slave cameras are in synchronization.

13 Claims, 4 Drawing Figures

VIDEO CAMERA SYNCHRONIZER

BACKGROUND OF THE INVENTION

1. Field of the Invention

The present invention relates to video recording, and more particularly refers to an apparatus which may be utilized to synchronize two or more color video cameras or other video devices for simultaneous operation.

2. Prior Art

Because of their many advantages, video cameras are used almost exclusively for photographing programs which are to be utilized for television broadcasting, as well as for video recording.

In a television studio, many color video signals are brought together at one point where they are selected, mixed, and/or altered. This point may be called the "switcher". The resultant signal leaves the switcher and goes to a transmitter for "airing" or to a video tape recorder for storage. In order for the switcher to do an adequate and acceptable job, it is required that all video signals at the switcher input be synchronized.

The human eye decodes light as parallel data decoding hue, saturation, and luminance. In contrast, a television system scans the scene and encodes this data as serial information. In order for a television system to convert parallel information to serial, a top (vertical sync) and a left (horizontal sync) must be determined. Additionally, chrominance information (hue and saturation) must be encoded and referenced to color sync. These three sync units are required so that the television receiver can decode the encoded information so that it can faithfully reproduce the scene as the camera views it.

One conventional method of synchronizing signals from several cameras is to have a master sync generator, usually close to the switcher. The master sync generator ator signals are distributed to all of the equipment which originates the video feeding the switcher, i.e., television cameras, title generators, film chains, etc. These cameras, etc., which are synchronized to each other are referred to as being "driven". By being driven, the video equipment is forced to stay in step with other driven video equipment in the system. As it takes only a small amount of time for a signal to go through a cable, and since this time is proportional to the length of the cable, all cables from synchronized, composite video must be electrically the same length from their source to the switcher. Normal practice dictates that the longest video line is run directly into the switcher, the other video lines are then electrically lengthened in order to match. This normally is a tedious operation. In contrast, in the present invention, it is accomplished by automatic timing.

A relatively inexpensive camera relies on digital techniques to generate vertical, horizontal, and color sync within the source. One of these cameras combined with a video tape recorder can provide a consumer with a means of making video home movies. As these cameras have no simple means of being externally synchronized, more than one video source cannot normally be used.

Presently, many different versions of N.T.S.C. (National Television Systems Committee) internal sync generators are in common use. However, most are of the digital type and derive the various synchronizing components from a 14.318180 MHz crystal-controlled oscillator, and use a countdown formula to arrive at the necessary color sync and drive components. Some equipment, such as inexpensive color cameras, use only a single, specially-designed, integrated circuit for a sync, with the only input being the 14.3 MHz crystal input.

The apparatus used for synchronizing video cameras in other forms of the prior art also have a number of disadvantages. The electronic equipment must be custom tailored to fit each make and model camera. This requires an inordinant amount of time to be spent in final engineering of the system. The custom tailored equipment is much too expensive and complicated. It depends on a non-standard, two-conductor, shielded drive cable between the camera and the synchronizer. The camera modification requires the incorporation of a switching-type jack to allow the camera to revert to normal, free running operation when disconnected from the synchronizing unit. The use of such a jack in itself causes reliability problems. The camera modification generally contains a negative voltage power supply which at times causes interference problems. Additionally, the cameras must be matched to the synchronizer with which they are to be used. There is no uniformity between cameras. A further disadvantage is the lock-up (synchronization) time is generally too long, often five minutes or more. This results from the fact that the apparatus simply speeds up or slows down the driven camera voltage-controlled oscillator. Further, the vertical odd/even fields detector circuits are unstable and require frequent realignment. After the unit locks-up (synchronizes the cameras), it sometimes unlocks and starts hunting again when the cameras are moved about (changing scenes and light levels). Further, after even a slight adjustment, one often must wait a long time for the unit to re-lock, to determine whether or not it is working properly. A further disadvantage of the prior art is that the voltage-controlled oscillator which drives voltage to the driven camera is often very noisy and must be carefully adjusted. Another disadvantage is that because of the large number of component parts which must be utilized, the circuit board is too large, crowded and complicated, making assembly and final testing extremely difficult. Final alignment requires much expertise and can only be accomplished by an engineer with very sophisticated equipment. Additionally, the power supply operates at maximum capacity, leaving no reserve for expansion to add additional driven camera outputs. Finally, the inherent color phase correction circuits are sometimes unstable and repeatability of system set-up can be a problem. Additionally, the manual phase control operation may be erratic.

As the term video camera is used herein, it is intended that the term also include other video devices.

DESCRIPTION OF THE PREFERRED EMBODIMENTS

Figure 1:
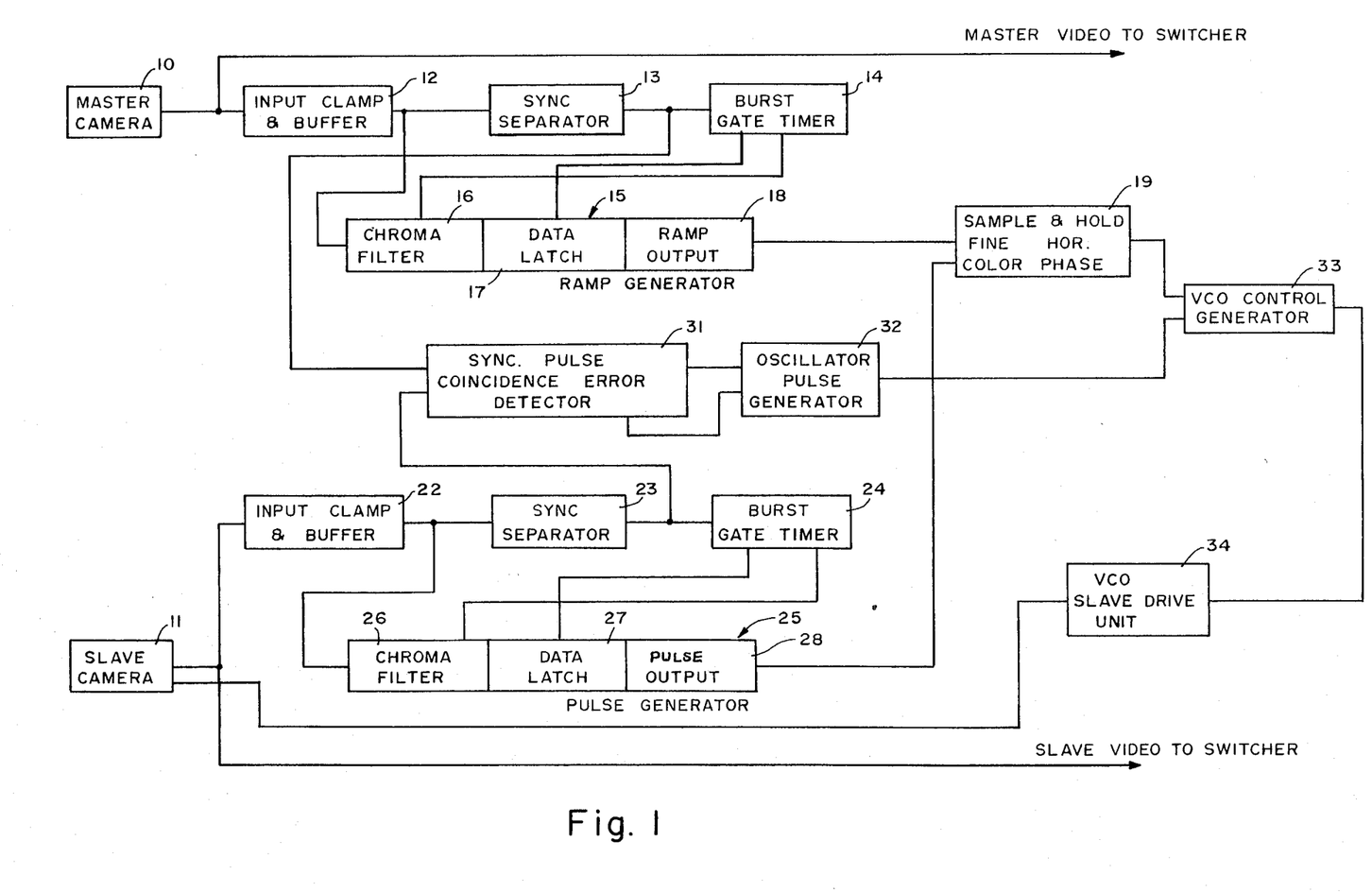
FIG. 1 is a block diagram of the synchronizing apparatus of the invention.

Referring to FIG. 1, a block diagram of the invention is shown comprising video cameras 10 and 11, camera 10 being the master camera and camera 11 being the slave camera, each camera having similar electrical components connected thereto. Associated with the master camera is an input clamp and buffer 12, a sync separator 13 and a burst gate timer 14. Also in the circuitry is a ramp generator comprising a chroma filter 16, a data latch 17 and a ramp output 18. The ramp output 18 is in turn connected to a sample and hold fine horizontal color phase sync 19.

Camera 11 output is connected to an input clamp and buffer 22, the output of which is connected to a sync separator 23 and a burst gate timer 24.

The input clamp and buffer 22, the sync separator 23 and the burst gate timer 24 are connected to a pulse generator 25 comprising a chroma filter 26, a data latch 27 and a sample pulse generator 28. The output of the sync separator 13 and the output of the sync separator 23 are connected to the input of a sync pulse coincidence error detector 31, the output of which is connected to an oscillator pulse generator 32. The output of the ramp output 18 and the sample pulse generator 28 are connected to the input of a sample and hold fine horizontal and color phase generator 19. The oscillator pulse generator 32 and the sample and hold color phase generator 19 are connected to the inputs of VCO control generator 33. The output of the VCO control generator 33 is connected to the input of a VCO slave drive unit 34, and the output of the VCO slave drive unit 34 is connected to the appropriate input of the slave camera 11 and controls its speed of operation.

Figure 2:
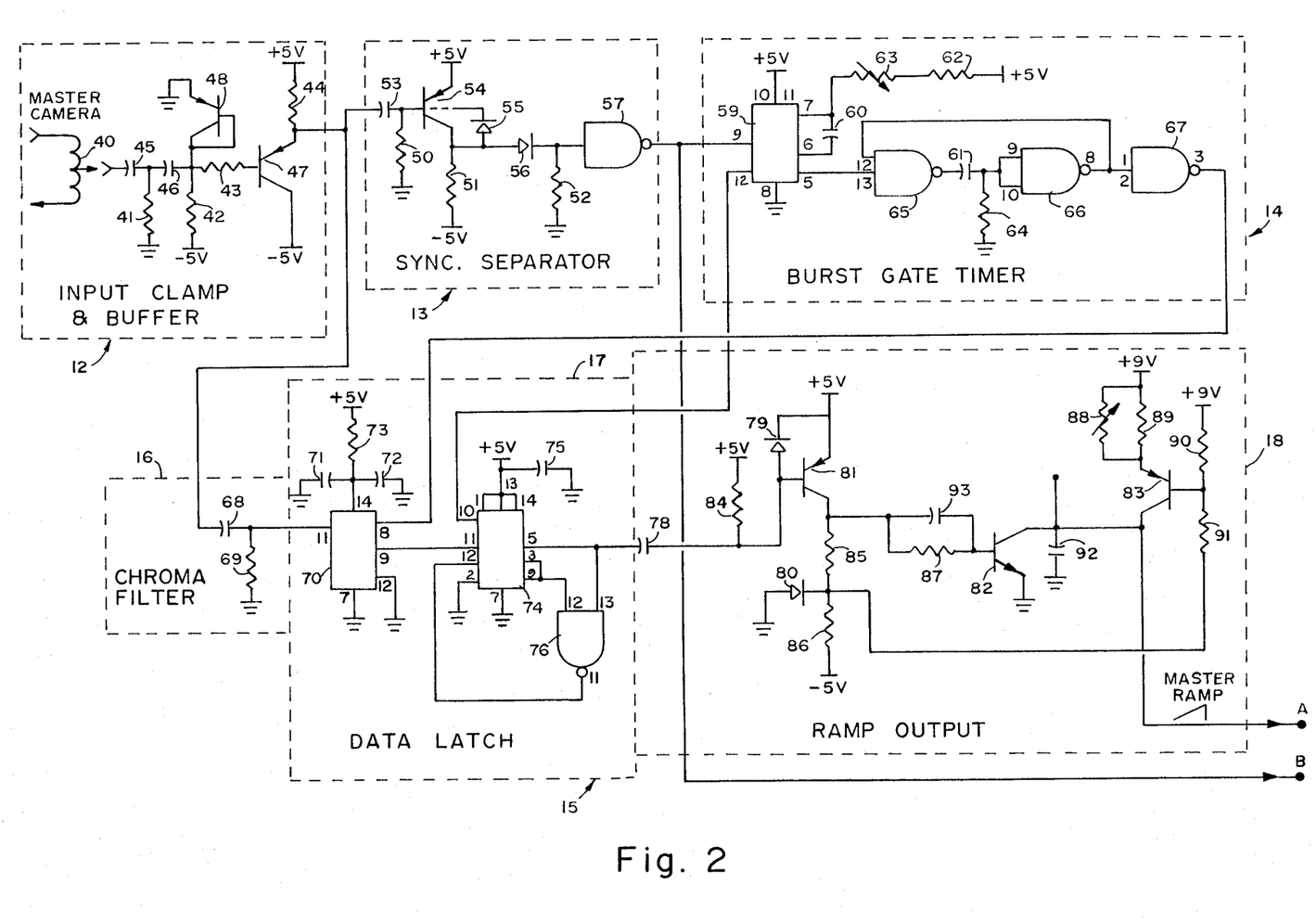
FIG. 2 is a circuit diagram of a portion of the apparatus shown in FIG. 1, showing the circuitry associated with the master camera.

Referring to FIG. 2, the circuitry associated with the master camera is shown. The circuit includes an input clamp and buffer 12 which comprises an input coil 40 receiving a signal from the master camera. The circuit additionally comprises resistors 41, 42, 43 and 44, capacitors 45 and 46, and NPN transistors 47 and 48.

The sync separator 13 comprises resistors 50, 51 and 52, a capacitor 53, a PNP transistor 54, diodes 55 and 56, and a NAND gate 57.

The burst gate timer 14 comprises an integrated circuit 59 which is one-half of a dual, monostable, multivibrator, capacitors 60 and 61, resistor 62, variable resistor 63 and resistor 64. The circuit also includes NAND gates 65, 66 and 67.

The ramp generator 15 includes a chroma filter 16 which comprises capacitor 68 and resistor 69. The generator also includes a data latch 17 which includes an integrated circuit 70 which is a high-speed, dual line receiver, which converts the incoming color bursts to TTL pulses, one-half used for the master camera channel and the other half used for the slave camera channel. The circuit additionally includes capacitors 71 and 72, a resistor 73, a flip-flop integrated circuit 74, a capacitor 75 and a NAND gate.

The ramp output 18 includes a capacitor 78, diodes 79 and 80, PNP transistors 81, and 83, NPN transistor 82, and resistors 84-91. Resistor 88 is a variable resistor.

Figure 3:
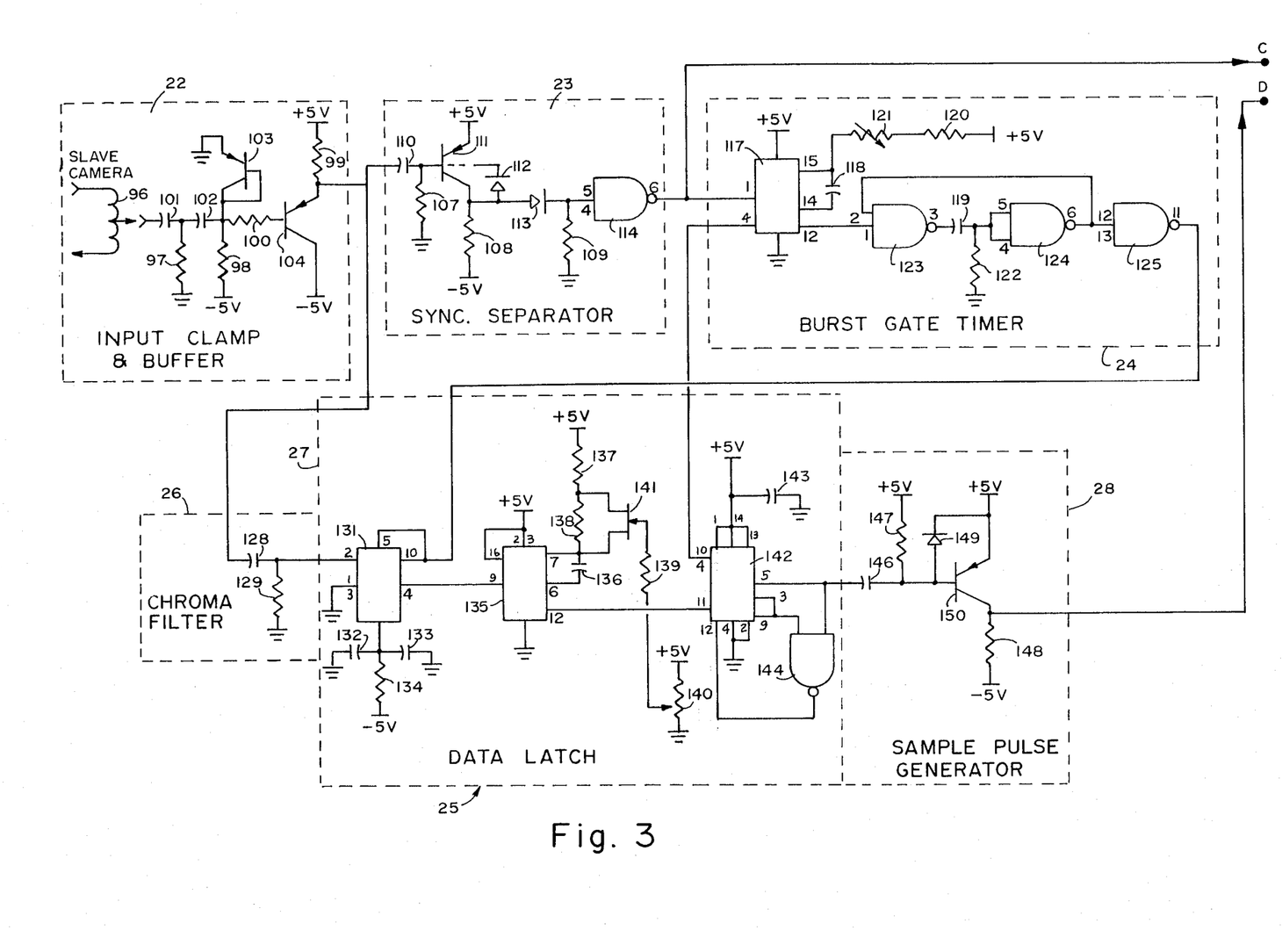
FIG. 3 is a circuit diagram of a remainder of the apparatus shown in FIG. 1, associated with the slave camera; and, FIG. 4 is a circuit diagram of a portion of the apparatus shown in FIG. 1, showing circuitry for combining the signals generated by the master and slave apparatus and generating signals to synchronize the slave camera to the master camera.

Referring to FIG. 3, the circuitry associated with the slave camera is shown. Generally, the circuitry is similar to that associated with the master camera except in certain specified circuitry differences. Similar to the circuitry of FIG. 2, the circuitry associated with the slave camera comprises an input clamp and buffer 22, which comprises an input coil 96 connected with the slave camera 11, resistors 97, 98, 99 and 100, capacitors 101 and 102, and PNP transistors 103 and 104.

The sync separator 23 comprises resistors 107, 108 and 109, a capacitor 110, PNP transistor 111, diodes 112 and 113, and a NAND gate 114.

The burst gate timer 24 comprises an integrated circuit 117, capacitors 118 and 119, resistor 120, a variable resistor 121 and a fixed resistor 122. The circuit additionally includes NAND gates 123, 124 and 125.

The chroma filter 26 includes a capacitor 128 and a resistor 129.

The data latch 27 comprises an integrated circuit TTL burst former 131, capacitors 132 and 133, a resistor 134, and integrated circuit (74221) 135 which is an extra integrated circuit to adjust the slave camera sync phase. The data latch 27 circuit also includes a capacitor 136, resistors 137, 138, 139 and a variable resistor 140. Additional components are a FET transistor 141, a flip-flop integrated circuit 142, a capacitor 143, and a NAND gate 144.

The sample pulse generator 28 comprises a capacitor 146, resistors 147 and 148, a diode 149, and a PNP transistor 150.

Figure 4:
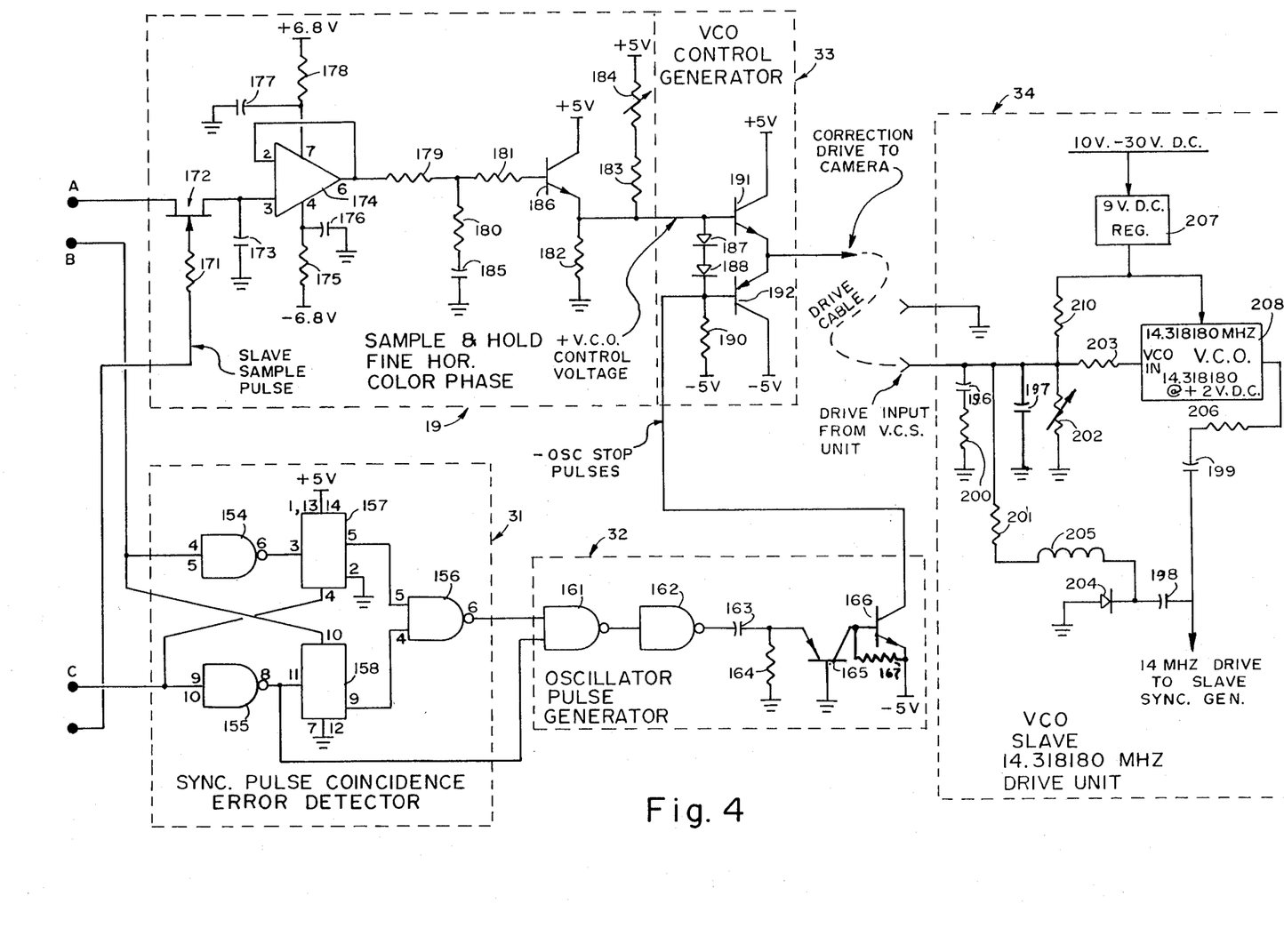

Referring to FIG. 4, the sync pulse error detector 31 comprises NAND gates 154, 155 and 156, flip-flop integrated circuits 157 and 158.

The oscillator pulse generator 32 comprises NAND gates 161 and 162, a capacitor 163, resistor 164 and 167, a PNP transistor 165, and an NPN transistor 167.

The sample and hold color phase synchronizer 19 comprises a resistor 171, a field effect transistor 172, a capacitor 173, an OP AMP 174, a resistor 175, capacitors 176 and 177, resistors 178, 179, 180, 181, 182 and 183, a variable resistor 184, and an NPN transistor 186.

The VCO control generator 33 comprises diodes 187 and and 188, resistor 190, an NPN transistor 191, and a PNP transistor 192.

The VCO slave drive unit 34 comprises capacitors 196, 197, 198 and 199, resistors 200, 201, 202, 203, and 210, a diode 204, a 100 microhenry choke coil 205, and a resistor 206. Additionally, a 9 volt DC regulator 207 and a conventional voltage control oscillator assembly 208 are utilized.

In the drawings, letters A, B, C and D are utilized to indicate the inter-connections among the circuits of FIGS. 2, 3 and 4. For example, the lead A of FIG. 2 is connected to lead A of the color phase sample and hold unit; lead B from FIG. 2 is connected to lead B of FIG. 4 at the sync pulse error detector 31. Lead C of FIG. 3 is also connected to lead C of the sync pulse error detector 31, and lead D of FIG. 3 is connected to lead D of FIG. 4 to the color phase sample and hold unit 19.

Preparing for operation, the synchronizer unit is connected to the master and slave video cameras. The composite sync from the master and slave sync separators is fed to the sync pulse coincidence detector circuit. This circuit develops positive error pulses if the master and slave video signals are not synchronized. These error pulses are "anded" with the slave composite sync. The result is a series of sharp, negative-going oscillator shut-off pulses which are present mainly during the slave vertical sync pulse. Because of the inverse voltage to frequency operation of the slave VCO unit, the slave, although hunting during this vertical sync period, keeps itself horizontally locked the balance of time during the framing process. The negative-going oscillator shut-off pulses occur at the master horizontal rate during the slave vertical period and the slave 14.318180 MHz oscillator keeps turning on and off, effectively slowing the slave sync generator down until the master catches up with it. The instant the master is in step with the slave, the output of the sync pulse coincidence detector goes low, turning off the oscillator stop pulses. The ramp signal developed from the color burst is monitored together with the color burst signal from the slave unit and any error voltage adjusts the voltage fed to the VCO and speeds up or slows down the output frequency of the VCO to maintain the master and slave video cameras in synchronization.

Although other components having other values may be substituted for those shown, the components designated in the specifications and drawings have the values shown on the following listings:

| Resistor | Ohms | Resistor | Ohms |
|---|---|---|---|
| #41 | 390K | #121 | 1K-variable |
| 42 | 150K | 122 | 220. |
| 43 | 1K | 129 | 100. |
| 44 | 1K | 134 | 100. |
| 50 | 150K | 137 | 4.7K |
| 51 | 1.8K | 138 | 1.5K |
| 52 | 680. | 139 | 10K |
| 62 | 8.2K | 140 | 1K-variable |
| 63 | 1K-variable | 147 | 2.2K |
| 64 | 220. | 148 | 1.8K |
| 69 | 100. | 164 | 470. |
| 73 | 100. | 167 | 1.5K |
| 84 | 2.2K | 171 | 3.3K |
| 85 | 680. | 175 | 100. |
| 86 | 1.8K | 178 | 100. |
| 87 | 1.8K | 179 | 100. |
| 88 | 200K-variable | 180 | 330. |
| 89 | 220K | 181 | 2.2K |
| 90 | 2.2K | 182 | 1K |
| 91 | 3.3K | 183 | 1K |
| 97 | 390K | 184 | 5K-variable |
| 98 | 150K | 190 | 100K |
| 99 | 1K | 200 | 75. |
| 100 | 1K | 201 | 220. |
| 107 | 150K | 202 | 5K-variable |
| 108 | 1.8K | 203 | 22K |
| 109 | 680. | 205 | 100uh.-choke |
| 120 | 8.2K | 206 | 220. |
|  |  | 210 | 12K |

| Capacitor |  | Capacitor |  |
|---|---|---|---|
| #45 | 10mfd | #128 | 470pf |
| 46 | 10mfd | 132 | .033mfd |
| 53 | 2.2mfd | 133 | 6.8mfd |
| 60 | .001mfd | 136 | 100pf |
| 61 | .0047mfd | 143 | 6.8mfd |
| 68 | 470pfd | 146 | 22pf |
| 71 | .033mfd | 163 | .02mfd |
| 72 | 6.8mfd | 173 | .0015mfd |
| 75 | 6.8mfd | 176 | 6.8mfd |
| 78 | 47 pf | 177 | 6.8mfd |
| 93 | 68 pf | 185 | 2.2mfd |
| 101 | 10mfd | 196 | 0.5mfd |
| 102 | 10mfd | 197 | 0.5mfd |
| 110 | 2.2mfd | 198 | .001mfd |
| 118 | .001mfd | 199 | .01mfd |
| 119 | .001mfd |  |  |

| Solid state components | |
|---|---|
| #47 | 2N3906 PNP transistor |
| 48 | 2N3906 PNP transistor |
| 54 | 2N3906 PNP transistor |
| 55 | 1N4148 diode |
| 56 | 1N4148 diode |
| 57 | 5400/7400 series NAND gate |
| 59 | 74221-½ dual monostable multivibrator |
| 65 | 5400/7400 series NAND gate |
| 66 | 5400/7400 series NAND gate |
| 67 | 5400/7400 series NAND gate |
| 70 | 75107-½ integrated circuit-high-speed dual line receiver |
| 74 | 7474 flip-flop integrated circuit |
| 76 | 5400/7400 series NAND gate |
| 79 | 1N4148 diode |
| 80 | 1N4148 diode |
| 81 | 2N3906 PNP transistor |
| 82 | 2N3904 NPN transistor |
| 83 | 2N3906 PNP transistor |
| 103 | 2N3906 PNP transistor |
| 104 | 2N3906 PNP transistor |
| 111 | 2N3906 PNP transistor |
| 112 | 1N4148 diode |
| 113 | 1N4148 diode |
| 114 | 5400/7400 series NAND gate |
| 117 | 74221-½ integrated circuit |
| 123 | 5400/7400 series NAND gate |
| 124 | 5400/7400 series NAND gate |
| 125 | 5400/7400 series NAND gate |
| 131 | 75107-½ integrated circuit |
| 135 | 74221-½ integrated circuit |
| 141 | 2N3823 FET |
| 142 | 7474 flip-flop integrated circuit |
| 144 | 5400/7400 series NAND gate |
| 149 | 1N4148 diode |
| 150 | 2N3906 PNP transistor |
| 154 | 5400/7400 series NAND gate |
| 155 | 5400/7400 series NAND gate |
| 156 | 5400/7400 series NAND gate |
| 157 | 7474 flip flop integrated circuit |
| 158 | 7474 flip flop integrated circuit |
| 161 | 5400/7400 series NAND gate |
| 162 | 5400/7400 series NAND gate |
| 165 | 2N3906 PNP transistor |
| 166 | 2N3904 NPN transistor |
| 172 | 2N4857 FET |
| 174 | LM741 OP AMP |
| 186 | 2N3904 NPN transistor |
| 187 | 1N4148 diode |
| 188 | 1N4148 diode |
| 191 | 2N3904 NPN transistor |
| 192 | 2N3906 PNP transistor |
| 204 | 1N4148 diode |

Although the discussion above has dealt primarily with synchronizing master and slave video cameras, the present invention may also be used to synchronize video signals from other sources. The prime requisites for so doing are that the devices must operate as follows:

1. Derive synchronizing pulses from a 14.318180 MHz control or its equivalent.

2. The composite video output of the generator must be in accordance with NTSC-RS-170a, or its equivalent.

Among the video signal-generating devices other than video cameras which may be synchronized are the following:

1. Color background generators.
2. Black burst generators.
3. Film and slide chains.
4. Test signal and pattern generators.
5. Video tape recorder time base connectors.
6. Computers.
7. Video signals taken off the air.

It is to be understood that the invention is not to be limited to the exact details of construction, operation, or exact materials or embodiments shown and described, as obvious modifications and equivalents will be apparent to one skilled in the art, and the invention is therefore to be limited only by the full scope of the appended claims.

I claim:

1. An apparatus for synchronizing a master video camera with one or more slave video cameras, which comprises:
   means for receiving output signals from said master and slave video cameras and deriving synchronizing signals from the output signals of said master and slave video cameras;
   means for comparing the synchronizing signals from said master and slave cameras and deriving an error signal when the synchronizing signals of said master and slave video cameras are not in synchronization;
   means connected to said error signal deriving means arranged to produce oscillator stop current pulses when actuated by said error signal;
   a voltage controlled oscillator arranged to receive said oscillator stop current pulses, connected to a control circuit of a slave video camera whereby, when said master and said slave video cameras are not in synchronization, the error signal from said error signal detecting means causes oscillator stop pulses to be produced which turn the output from said voltage-controlled oscillator on and off until the master video camera signal and the slave video signal are in synchronization.

2. An apparatus for synchronizing a master video camera with one or more slave video cameras, which comprises:
   means for receiving output signals from said master and slave video cameras;
   means for deriving synchronizing signals from the output signals of said master and slave video cameras;
   means for comparing the signals from said master and slave cameras and deriving an error signal when the synchronizing signals of said master and slave video cameras are not in synchronization;
   means connected to said error signal deriving means arranged to produce oscillator stop current pulses when actuated by said error signal;
   means receiving a signal from said master video camera and deriving a color burst signal therefrom;
   means receiving said color burst signal and generating a ramp signal therefrom;
   means receiving the signal from said slave video camera and deriving a color burst signal therefrom;
   means receiving said color burst signal and deriving a sample pulse therefrom;
   means deriving a combined signal constituting the sum of said ramp signal and said sample pulse signal;
   means combining said oscillator stop current pulses with the sum of said ramp signal and said sample pulse signals to form a combined control signal;
   a voltage controlled oscillator arranged to receive said combined control signal and having its output connected to the control circuit of said slave video camera whereby, when said master and said video cameras are not in synchronization, the error signal from said error signal deriving means causes oscillator stop pulses to be produced which turn the output from said voltage-controlled oscillator on and off until the master video camera signal and the slave video signal are in synchronization, and whereby small errors in synchronization appear as error signals between the ramp signal and the slave sample pulse, thereby changing the voltage applied to the voltage-controlled oscillator to change the frequency applied to the slave camera until the master and slave video camera signals are once again in synchronization.

3. Apparatus according to claim 2, wherein the normal operating frequency of said voltage-controlled oscillator is 14.318180 MHz.

4. Apparatus according to claim 2, wherein the color burst frequency of said circuit is 3.58 MHz.

5. Apparatus according to claim 2, wherein the means for deriving synchronized signals from the output signals of said master and slave video cameras comprises input clamp and buffers and sync separators.

6. Apparatus according to claim 2, wherein the means for receiving signals from said master video camera and said slave video camera and deriving color burst signals from each comprises a burst gate timer and a chroma filter.

7. Apparatus according to claim 2, wherein said means for receiving a color burst signal from said master camera and generating a ramp signal therefrom comprises a data latch and a ramp signal generator.

8. Apparatus according to claim 2, wherein said means for receiving a color burst signal from said slave camera and deriving a sample pulse therefrom is a data latch and a sample pulse generator.

9. Apparatus according to claim 2, wherein said means for deriving a combined signal constituting the sum of said ramp signal and said sample pulse signal is a sample and hold fine horizontal color phase.

10. Apparatus according to claim 2, wherein said means combining said oscillator stop current pulses with the sum of said ramp signal and said sample pulse signal to form a combined control signal is a voltage-controlled oscillator control generator.

11. A method for synchronizing a master video camera with one or more slave video cameras, which comprises:
   acquiring output signals from said master and slave video camera control signals;
   deriving synchronizing signals from the output signals of said master and slave video cameras;
   comparing the synchronizing signals from said master and slave cameras and deriving an error signal when the synchronizing signals of said master and slave video cameras are not in synchronization;
   producing oscillator stop current pulses when an error signal exists;
   receiving a signal from said master video camera and deriving a color burst signal therefrom;
   utilizing said color burst signal to generate a ramp signal therefrom;
   receiving the signal from said slave video camera and deriving a color burst signal therefrom;
   utilizing said color burst signal to derive a sample pulse therefrom;
   deriving a combined signal constituting the sum of said ramp signal and said sample pulse signal;
   combining said oscillator stop current pulses with the sum of said ramp signal and said sample pulse signals to form a combined control signal;
   applying said combined control signal to a voltage controlled oscillator to pulse said voltage-controlled oscillator output on and off and to vary the frequency of said voltage-controlled oscillator until said master and said slave video cameras are in synchronization.

12. A method for synchronizing a master video camera with one or more slave video cameras, which comprises:

receiving output signal from said master and slave video cameras;

deriving synchronizing signals from the output signals of said master and slave video cameras;

comparing the signals from said master and slave cameras and deriving an error signal when the synchronizing signals of said master and slave video cameras are not in synchronization;

producing oscillator stop current pulses when an error signal exists;

applying said oscillator stop current pulses to a voltage controlled oscillator which controls said slave video camera to pulse the output of said voltage controlled oscillator on and off until said master and said slave video cameras are in synchronization;

said voltage controlled oscillator being arranged to receive said oscillator stop current pulses, connected to a control circuit of a slave video camera whereby, when said master and said slave video cameras are not in synchronization, the error signal causes oscillator stop pulses to be produced which turn the output from said voltage controlled oscillator on and off until the master video camera signal and the slave video signal are in synchronization.

13. An apparatus for synchronizing a video signal from a master video signal-generating device with a video signal or signals from one or more slave video signal-generating devices, which comprises:

means for receiving output signals from said master and slave video devices and deriving synchronizing signals from the output signals of said master and slave video devices;

means for comparing the synchronizing signals from said master and slave video devices and deriving an error signal when the synchronizing signals of said master and slave video devices are not in synchronization;

means connected to said error signal-deriving means arranged to produce oscillator stop current pulses when actuated by said error signal;

a voltage-controlled oscillator arranged to receive said oscillator stop current pulses connected to a control circuit of the slave video device whereby, when signals from said master and slave video devices are not in synchronization, the error signal from said error signal-deriving means causes oscillator stop pulses to be produced which turn the output from said voltage-controlled oscillator on and off until the master video device signal and the slave video device signal are in synchronization.

* * * * *

UNITED STATES PATENT AND TRADEMARK OFFICE
CERTIFICATE OF CORRECTION

PATENT NO. : 4,489,348

DATED : December 18, 1984

INVENTOR(S) : John A. Lepley

It is certified that error appears in the above-identified patent and that said Letters Patent is hereby corrected as shown below:

Drawings, Sheet 4, Figure 4, lefthand side, bottom dot " . ";
should be named D, like shown -- •  --
                                                    D Col. 1, line 38; delete "ator"

Signed and Sealed this

Twenty-first Day of January 1986

[SEAL]

Attest:

DONALD J. QUIGG

Attesting Officer      Commissioner of Patents and Trademarks